US012622462B2

(12) United States Patent     (10) Patent No.:   US 12,622,462 B2

Liao et al.     (45) Date of Patent:    May 12, 2026

(54) COMPOSITE LIQUID GUIDE COTTON, HEATING ASSEMBLY, VAPORIZER, AND ELECTRONIC VAPORIZATION DEVICE

(71) Applicant: SHENZHEN SMOORE TECHNOLOGY LIMITED, Shenzhen (CN)

(72) Inventors: Junfeng Liao, Shenzhen (CN); Zhanggui Lan, Shenzhen (CN); Zhihua Wen, Shenzhen (CN); Zhong Luo, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 645 days.

(21) Appl. No.: 17/988,232

(22) Filed: Nov. 16, 2022

(65) Prior Publication Data

US 2023/0157361 A1    May 25, 2023

(30) Foreign Application Priority Data

Nov. 19, 2021    (CN) .......................... 202111408312.2

(51) Int. Cl.
*A24F 40/44*      (2020.01)
*A24F 40/10*      (2020.01)
        (Continued)

(52) U.S. Cl.
CPC .............. *A24F 40/44* (2020.01); *A24F 40/10* (2020.01); *A24F 40/42* (2020.01); *A24F 40/46* (2020.01); *B32B 5/022* (2013.01); *B32B 5/265* (2021.05); *B32B 2250/20* (2013.01); *B32B*

*2260/021* (2013.01); *B32B 2260/04* (2013.01); *B32B 2262/062* (2013.01); *B32B 2307/306* (2013.01);
        (Continued)

(58) Field of Classification Search
CPC ........................................................ A24F 40/44
USPC ............................................................. 40/44
See application file for complete search history.

(56) References Cited

U.S. PATENT DOCUMENTS 9,555,198 B2   1/2017   Yang et al.
9,861,134 B2 *   1/2018   Zhu ........................... H05B 3/24
        (Continued)

FOREIGN PATENT DOCUMENTS

CN     201300208 Y     9/2009
CN     104062151 A     9/2014
        (Continued)

OTHER PUBLICATIONS

CN115804475 English Translation obtained from EPO, pp. 1-14 (Year: 2025).*
        (Continued)

*Primary Examiner* — Jill A Warden

(74) *Attorney, Agent, or Firm* — Leydig, Voit & Mayer, Ltd.

(57) ABSTRACT

A composite liquid guide cotton for a vaporizer includes: at least one heat resistant layer, at least one first isolation layer, at least one rapid liquid guide layer, and at least one second isolation layer that are stacked in sequence. The heat resistant layer contacts a heating body and comprises a high-temperature resistant material. A liquid guide rate of the rapid liquid guide layer is higher than a liquid guide rate of the first isolation layer and the second isolation layer.

5 Claims, 12 Drawing Sheets

(51) Int. Cl.

| | | |
|---|---|---|
| *A24F 40/42* | (2020.01) | |
| *A24F 40/46* | (2020.01) | |
| *B32B 5/02* | (2006.01) | |
| *B32B 5/26* | (2006.01) | |

(52) U.S. Cl.
CPC ... *B32B 2307/726* (2013.01); *B32B 2307/732* (2013.01); *B32B 2307/758* (2013.01)

(56) References Cited

U.S. PATENT DOCUMENTS

| | | | | |
|---|---|---|---|---|
| 10,506,827 | B2* | 12/2019 | Guo | B06B 1/0651 |
| 2013/0081642 | A1* | 4/2013 | Safari | A24B 15/16 131/347 |
| 2014/0190478 | A1* | 7/2014 | Liu | A24F 40/44 128/202.21 |
| 2014/0261487 | A1* | 9/2014 | Chapman | A24F 40/30 87/6 |
| 2015/0296884 | A1 | 10/2015 | Liu | |
| 2016/0029700 | A1 | 2/2016 | Li et al. | |
| 2016/0073694 | A1 | 3/2016 | Liu | |
| 2018/0289066 | A1 | 10/2018 | Mo et al. | |
| 2019/0001077 | A1 | 1/2019 | Xu et al. | |
| 2021/0000159 | A1* | 1/2021 | Araki | A24F 23/02 |
| 2021/0186097 | A1 | 6/2021 | Schmidt et al. | |

FOREIGN PATENT DOCUMENTS

| | | | | | |
|---|---|---|---|---|---|
| CN | 105476073 | A | | 4/2016 | |
| CN | 109198725 | A | | 1/2019 | |
| CN | 111728281 | A | | 10/2020 | |
| CN | 212088063 | U | | 12/2020 | |
| CN | 112656032 | A | | 4/2021 | |
| CN | 213029728 | U | | 4/2021 | |
| CN | 214160108 | U | | 9/2021 | |
| CN | 214179125 | U | | 9/2021 | |
| CN | 216875004 | U | | 7/2022 | |
| CN | 115804475 | A | * | 3/2023 | ........... A24F 40/465 |

OTHER PUBLICATIONS

Chinese Patent Office, Office Action in Chinese Patent Application No. 202111408312.2 (Nov. 29, 2024).

European Patent Office, Search Report in European Patent Application No. 22206844.7 (Apr. 19, 2023).

European Patent Office, Search Report in European Patent Application No. 22206868.6 (May 9, 2023).

European Patent Office, Search Report in European Patent Application No. 22206847.0 (May 24, 2023).

* cited by examiner

COMPOSITE LIQUID GUIDE COTTON, HEATING ASSEMBLY, VAPORIZER, AND ELECTRONIC VAPORIZATION DEVICE

CROSS-REFERENCE TO PRIOR APPLICATION

Priority is claimed to Chinese Patent Application No. 202111408312.2, filed on Nov. 19, 2021, the entire disclosure of which is hereby incorporated by reference herein.

FIELD

The invention relates to the field of vaporization, and more particularly, to a composite liquid guide cotton, a heating assembly, a vaporizer and an electronic vaporization device.

BACKGROUND

An electronic vaporization device is mainly composed of a vaporizer and a power supply device. The power supply device is used to supply power to the vaporizer, and the vaporizer can heat and vaporize vaporization liquid stored in the vaporizer after being powered on. In general, the vaporizer includes a liquid guide cotton and a heating member in contact with the liquid guide cotton. The vaporization liquid stored in the vaporizer is adsorbed by the liquid guide cotton, and the heating member heats the vaporization liquid absorbed by the liquid guide cotton after being powered on. The liquid guide cotton is prone to burning if its temperature resistance is not enough. Since it takes some time for the absorption and conduction of the vaporization liquid in the liquid guide cotton, if the liquid absorbing speed and liquid guiding speed of the liquid guide cotton are too slow, the vaporized gas generated after vaporization will be dry and light, the fragrance release is not sufficient, and in severe cases, dry burning may even occur and results in burning smell.

SUMMARY

In an embodiment, the present invention provides a composite liquid guide cotton for a vaporizer, the composite liquid guide cotton comprising: at least one heat resistant layer, at least one first isolation layer, at least one rapid liquid guide layer, and at least one second isolation layer that are stacked in sequence, wherein the heat resistant layer is configured to contact a heating body and comprises a high-temperature resistant material, and wherein a liquid guide rate of the rapid liquid guide layer is higher than a liquid guide rate of the first isolation layer and the second isolation layer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
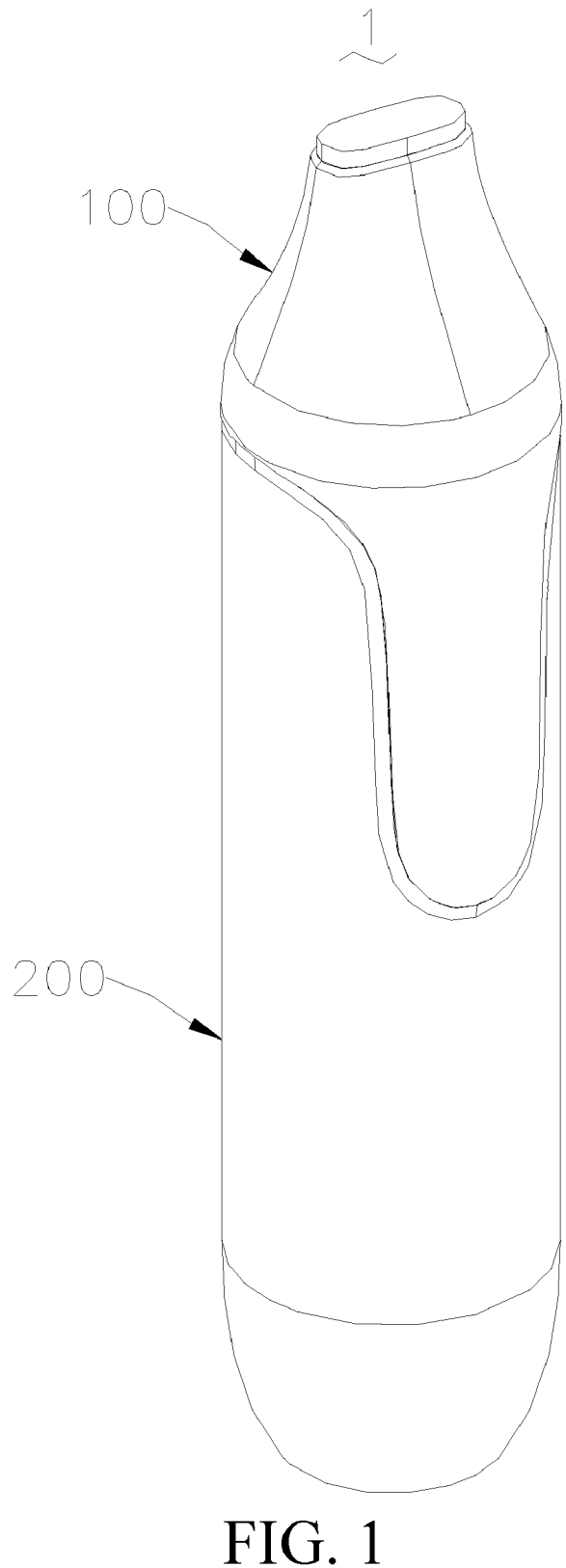
FIG. 1 is a schematic three-dimensional structural view of an electronic vaporization device in Embodiment 1 of the invention.

In an embodiment, the present invention provides an improved composite liquid guide cotton, and a heating assembly, vaporizer and electronic vaporization device having the composite liquid guide cotton.

In an embodiment, the present invention provides a composite liquid guide cotton for a vaporizer. The composite liquid guide cotton includes at least one heat resistant layer, at least one first isolation layer, at least one rapid liquid guide layer and at least one second isolation layer that are stacked in sequence. The heat resistant layer is used to contact with a heating body and is made of a high-temperature resistant material, and the liquid guide rate of the rapid liquid guide layer is higher than that of the first isolation layer and the second isolation layer.

In some embodiments, the number of layers of the rapid liquid guide layers is two.

In some embodiments, the number of layers of each of the heat resistant layer, the first isolation layer, and the second isolation layer is one.

In some embodiments, the rapid liquid guide layer is wood pulp cotton.

In some embodiments, the wood pulp cotton has a weight of 50 g±10% per square meter before soaking.

In some embodiments, the heat resistant layer when soaked with vaporization liquid has a temperature resistance of 300° C. or above.

In some embodiments, the heat resistant layer is linen cotton.

In some embodiments, the linen cotton has a weight of 45 g±10% per square meter before soaking.

In some embodiments, both the first isolation layer and the second isolation layer are made of materials capable of isolating odors.

In some embodiments, both the liquid storage capacity of the first isolation layer and the liquid storage capacity of the second isolation layer are higher than that of the rapid liquid guide layer.

In some embodiments, both the first isolation layer and the second isolation layer are non-woven fabrics.

In some embodiments, the non-woven fabric has a weight of 75 g±10% per square meter before soaking.

In some embodiments, the non-woven fabric has a thickness of 0.3 mm-0.4 mm before soaking.

In some embodiments, the composite liquid guide cotton includes one heat resistant layer, one first isolation layer, two rapid liquid guide layers and one second isolation layer that are stacked in sequence.

The heat resistant layer is linen cotton, both the first isolation layer and the second isolation layer are non-woven fabrics, and the rapid liquid guide layer is wood pulp cotton.

The invention also provides a heating assembly, including the composite liquid guide cotton according to any one of the above and a heating body in contact with the heat resistant layer.

In some embodiments, the composite liquid guide cotton includes an annular first liquid guide portion, the first liquid guide portion wrapping the outside of the heating body.

In some embodiments, the heating assembly also includes a tubular heating base, the heating base sleeving the outside of the first liquid guide portion.

In some embodiments, the first liquid guide portion has a first end and a second end opposite to the first end in the circumferential direction, and the side wall of the heating base is provided with a slot through which the first end and the second end can pass.

In some embodiments, the composite liquid guide cotton also includes an annular second liquid guide portion wrapping the outside of the heating base, and one circumferential end of the second liquid guide portion is connected to the first end of the first liquid guide portion.

In some embodiments, the composite liquid guide cotton also includes a first extension portion connected to the second end of the first liquid guide portion and extending out of the slot, and a second extension portion connected to the other circumferential end of the second liquid guide portion.

In some embodiments, the first extension portion and the second extension portion are the same in extension direction, and the first extension portion and the second extension portion are fit to each other.

The invention also provides a vaporizer, including the heating assembly according to any one of the above.

In some embodiments, the vaporizer includes a liquid storage shell and a liquid storage member disposed in the liquid storage shell, and the liquid storage member is annular and wraps the outside of the heating assembly.

The invention also provides an electronic vaporization device, including the vaporizer according to any one of the above.

With the implementation of the invention, at least the following beneficial effects are obtained: the invention forms the composite liquid guide cotton by stacking the heat resistant layer, the first isolation layer, the rapid liquid guide layer, and the second isolation layer in sequence, and the heat resistant layer in contact with the heating body is made of the high-temperature resistant material, which can prevent the burning smell when heated; and the rapid liquid guide layer located at the middle layer has a higher liquid guide rate, which can speed up the liquid absorption and guiding of the composite liquid guide cotton, and alleviate the dryness and lightness of the vaporized gas and insufficient fragrance release, thus improving the user experience.

In order to understand the technical features, objects and effects of the invention clearer, the specific implementations of the invention will now be described in detail with reference to the accompanying drawings. In the following description, numerous specific details are set forth in order to provide a thorough understanding of the invention. However, the invention can be implemented in many other ways different from those described herein, and those skilled in the art can make similar improvements without departing from the connotation of the invention. Therefore, the invention is not limited to the specific embodiments disclosed below.

In the description of the invention, it should be understood that the orientation or positional relationship indicated by the terms "center", "longitudinal", "lateral", "length", "width", "thickness", "upper", "lower", "front", "rear", "left", "right", "vertical", "horizontal", "top", "bottom", "inner", "outer", "axial", "radial", "circumferential", and the like is based on the orientation or positional relationship shown in the accompanying drawings or the orientation or positional relationship that the product of the invention is usually placed in use, and is only used for describing the invention and simplifying the description, rather than indicating or implying a device or an element specified needs to have a specific orientation, be constructed and operated in a specific orientation, and therefore cannot be understood as a limit to the invention.

In addition, the terms "first" and "second" are only used for the purpose of description, and cannot be understood as indicating or implying relative importance or implicitly indicating the quantity of indicated technical features. Thus, the feature defined with "first" or "second" may explicitly or implicitly include at least one that feature. In the description of the invention, "a plurality of" means at least two, such as two or three, unless expressly specifically limited otherwise.

In the invention, unless otherwise expressly specified and limited, the terms such as "installation", "link", "connection" and "fixation" should be understood in a broad sense, for example, it may be fixed connection or detachable connection, or integration; and it may be mechanical connection or electrical connection; and it may be direct link or indirect link through an intermediary, and it may be internal communication of two elements or interaction between two elements, unless specifically limited otherwise. For a person of ordinary skill in the art, the specific meanings of the above-mentioned terms in the invention can be understood according specific situations.

In the invention, unless otherwise expressly specified and limited, the first feature being "on" or "under" the second feature may mean that the first and second features are in direct contact, or the first and second features are in indirect contact through an intermediary. Moreover, the first feature being "above", "over" and "onto" the second feature may mean that the first feature is directly above or diagonally above the second feature, or simply means that the horizontal height of the first feature is higher than that of the second feature. The first feature being "under", "below" and "underneath" the second feature may mean that the first feature is directly below or diagonally below the second feature, or simply means that the horizontal height of the first feature is lower than that of the second feature.

Figure 2:
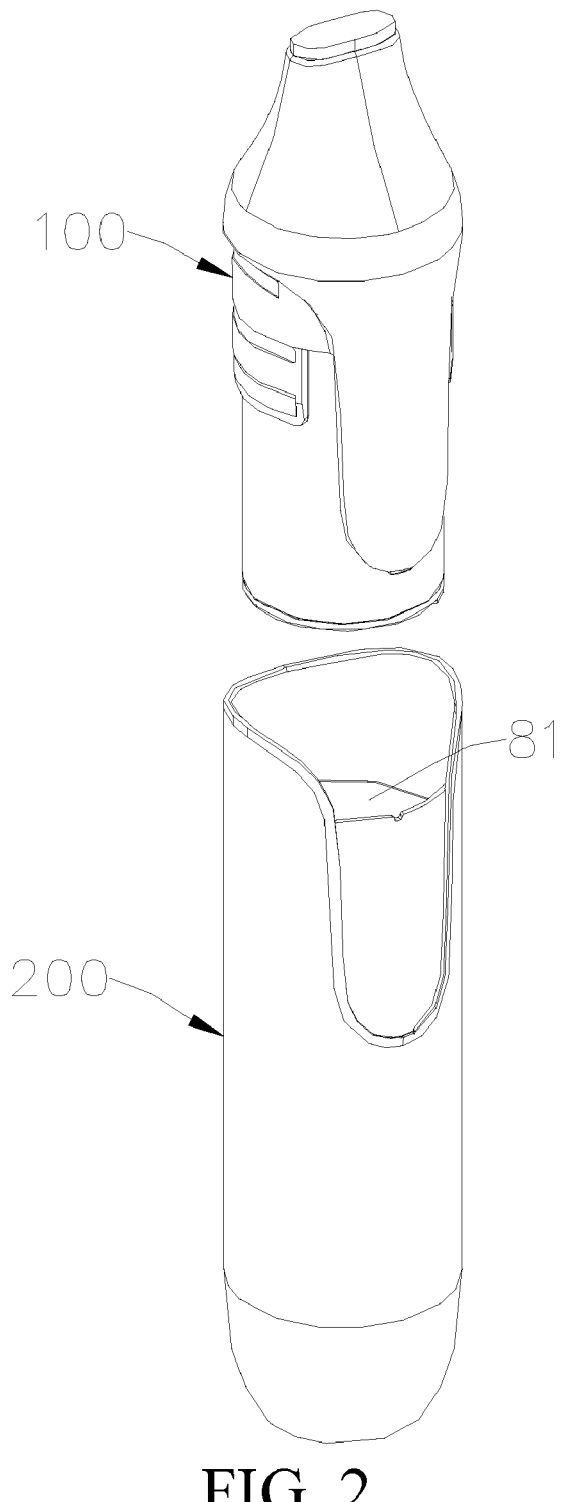
FIG. 2 is a schematic exploded structural view of the electronic vaporization device in FIG. 1.
Figure 3:
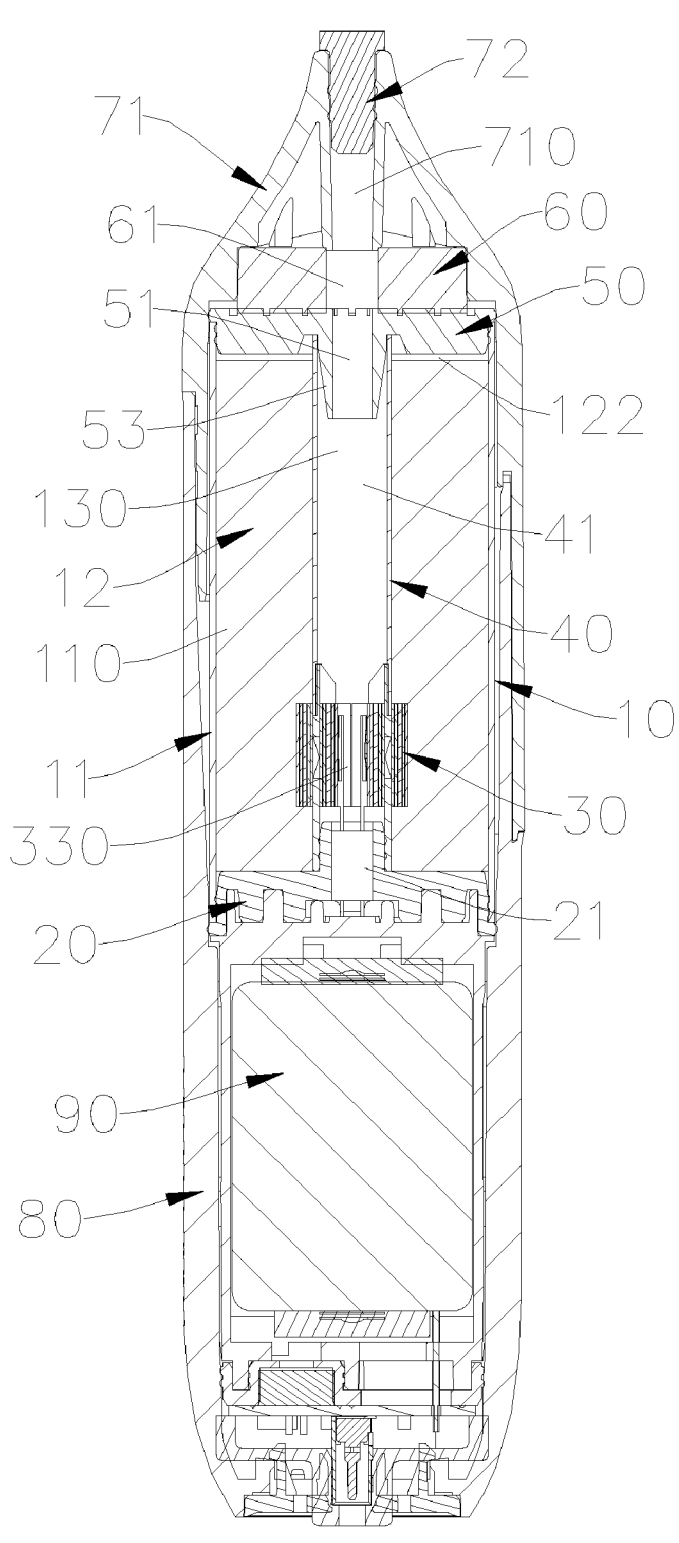
FIG. 3 is a schematic longitudinal section structural view of the electronic vaporization device in FIG. 1.

FIGS. 1-3 show an electronic vaporization device 1 in Embodiment 1 of the invention. In some embodiments, the electronic vaporization device 1 may be substantially columniform, and may include a power supply device 200 and a vaporizer 100 disposed above the power supply device 200 in the longitudinal direction. The vaporizer 100 is used to accommodate vaporization liquid and heating and vaporizing the vaporization liquid to generate an aerosol, and the power supply device 200 is used to supply power to the vaporizer 100. It can be understood that, in other embodiments, the electronic vaporization device 1 is not limited to a columniform shape, and it may also have other shapes such as an oval columnar shape, a square columnar shape, and a flat columnar shape.

The power supply device 200 may include a shell 80 and a battery 90 accommodated in the shell 80. The battery 90 is electrically connected to the heating assembly 30 of the vaporizer 100 for supplying power to the heating assembly 30. The shell 80 may be substantially cylindrical, the battery 90 may be accommodated in the lower part of the shell 80, and an accommodating space 81 for accommodating the vaporizer 100 is formed on the upper part of the shell 80.

Figure 4:
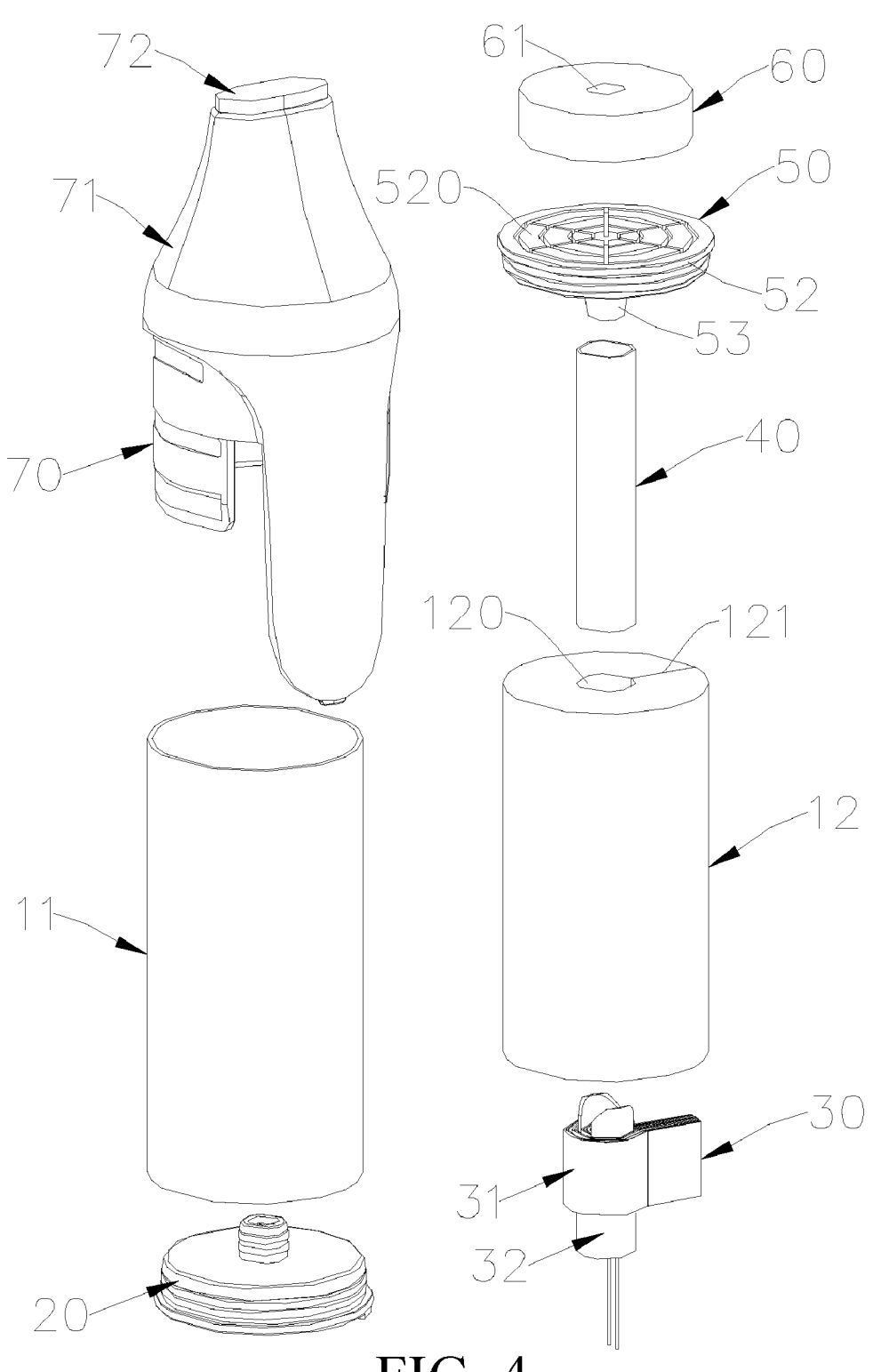
FIG. 4 is a schematic exploded structural view of a vaporizer in FIG. 2.

As shown in FIGS. 3-4, in some embodiments, the vaporizer 100 may include a liquid reservoir 10, a base 20, a heating assembly 30, a vent tube 40, an end cap 50, a liquid absorbing member 60 and a suction nozzle assembly 70.

The liquid reservoir 10 is used to store the vaporization liquid, and may include a liquid storage shell 11. In this embodiment, the liquid storage shell 11 is in a cylinder shape with both ends open. The vent tube 40 penetrates into the liquid storage shell 11 in the longitudinal direction and may be coaxially provided with the liquid storage shell 11. An annular liquid storage space 110 is formed between the outer wall surface of the vent tube 40 and the inner wall surface of the liquid storage shell 11. The inner wall surface of the vent tube 40 defines an airflow channel 41. In some embodiments, the vent tube 40 may be a fiberglass tube to reduce cost. In other embodiments, the vent tube 40 may also be made of other materials such as plastic and metal.

In some embodiments, the liquid reservoir 10 may also include a liquid storage member 12 disposed in the liquid storage space 110 for absorbing and storing a certain amount of vaporization liquid. The liquid storage member 12 is in an annular column shape, and a through hole 120 for the vent tube 40 to pass through is formed therein in the longitudinal direction. The liquid storage member 12 may generally be a liquid storage cotton, so as to absorb and store more vaporization liquid. In some embodiments, a bayonet 121 is formed in the side wall of the liquid storage member 12, such that the liquid storage member 12 is in a C-shaped cylindrical shape, which can facilitate the clamping of the liquid storage member 12 on the periphery of the vent tube 40.

The heating assembly 30 is disposed in the liquid storage shell 11 and in contact with the liquid storage member 12, and is used to heat and vaporize the vaporization liquid stored in the liquid storage member 12 after being powered on. A vaporization cavity 330 may be formed on the heating assembly 30 in the longitudinal direction, and the vaporization cavity 330 may be communicated with the lower end of the airflow channel 41. The heating assembly 30 may include a composite liquid guide cotton 31 that is in contact with the liquid storage member 12 for absorbing the vaporization liquid from the liquid storage member 12, a heating body 33 disposed on the composite liquid guide cotton 31 for heating and vaporizing the vaporization liquid after being powered on, and a heating base 32 for supporting the composite liquid guide cotton 31.

Figure 5:
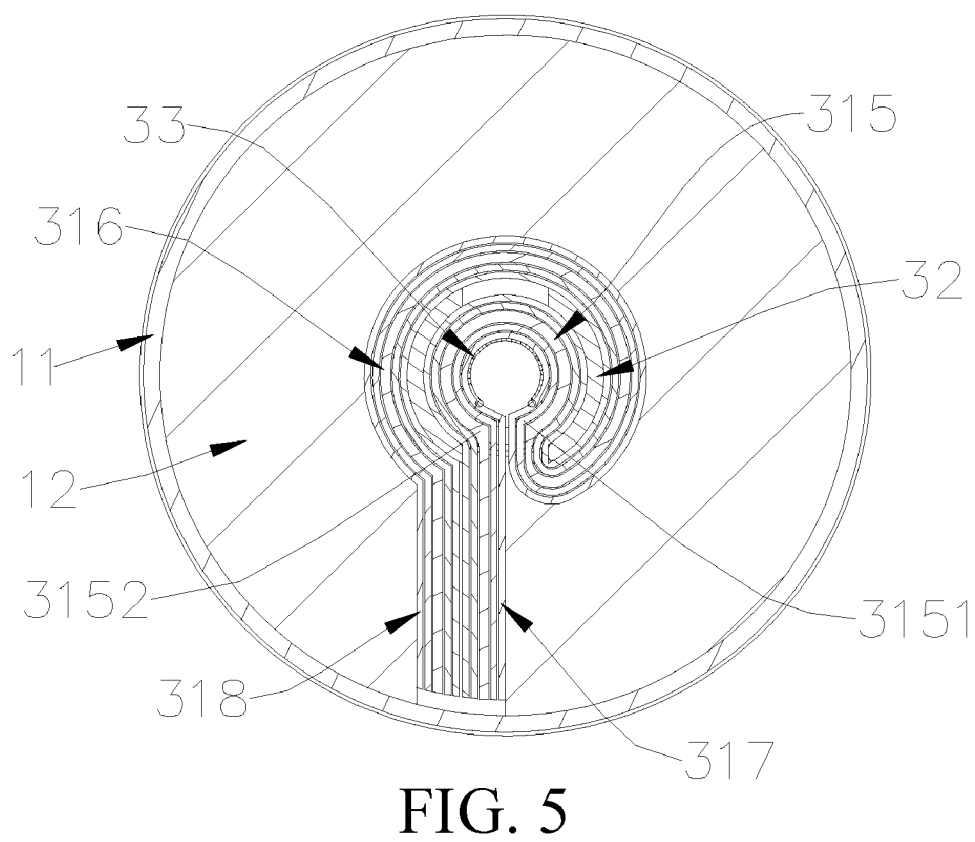
FIG. 5 is a schematic transversal section structural view of the vaporizer in FIG. 2.
Figure 6:
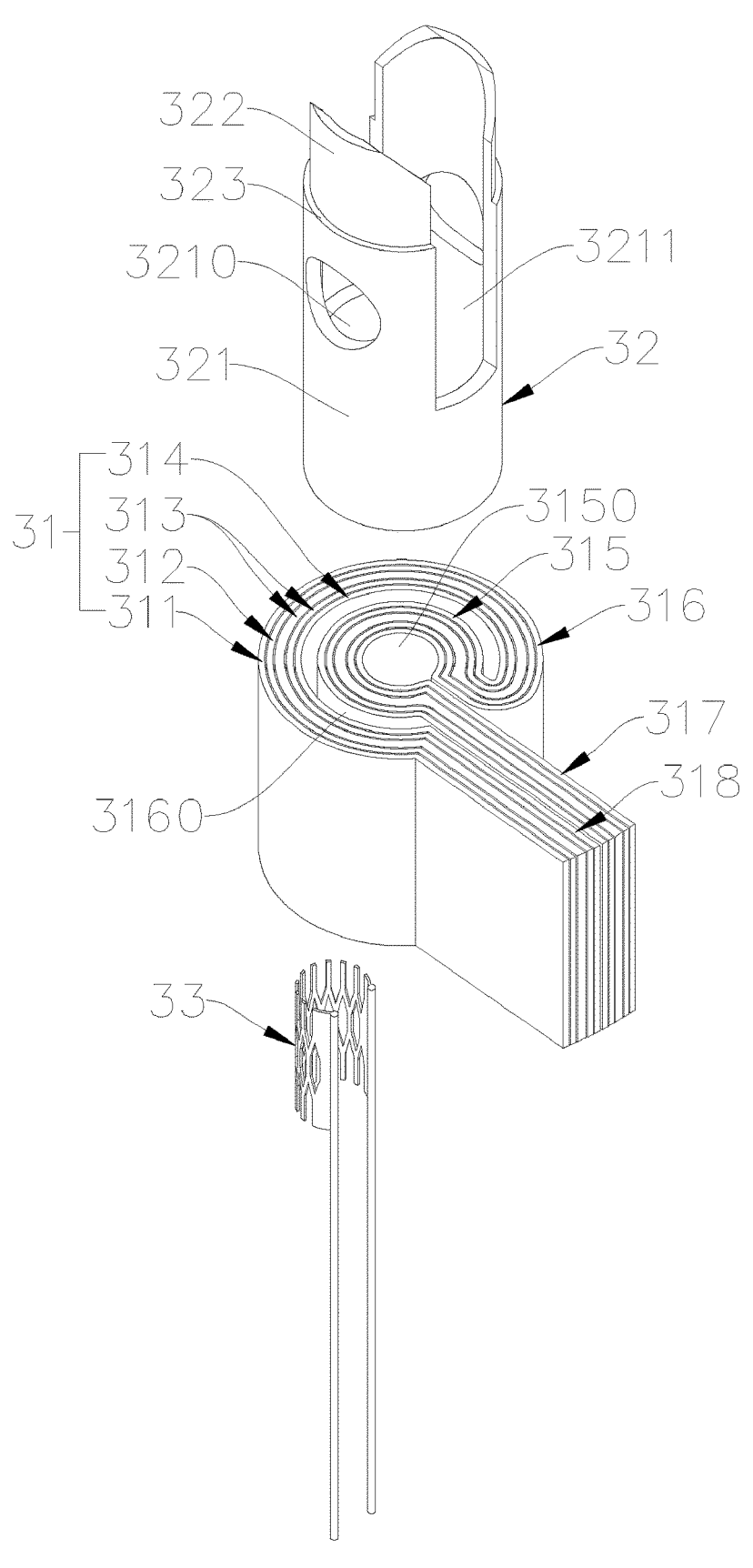
FIG. 6 is a schematic exploded structural view of a heating assembly in FIG. 4.

As shown in FIGS. 5-6, in some embodiments, the composite liquid guide cotton 31 may include at least one heat resistant layer 311, at least one first isolation layer 312, at least one rapid liquid guide layers 313 and at least one second isolation layer 314 that are stacked in sequence.

The heat resistant layer 311 may be in contact with the liquid storage member 12 and the heating body 33 respectively, and may be made of a material that absorbs liquid quickly and is high-temperature resistant, so as to prevent burning smell during heating. In this embodiment, there is one heat resistant layer 311 and the heat resistant layer is made of linen cotton which has the advantages of fast liquid absorption, fast absorption and fast drying, high temperature resistance, less possibility of burning smell, and antibacterial property. The linen cotton may have a weight of 45 g±10% per square meter before soaking. The linen cotton when soaked with the vaporization liquid has a temperature resistance of 200° C. or above, preferably, 300° C. or above.

The rapid liquid guide layer 313 has a high liquid guide rate, which is better than that of the heat resistant layer 311, the first isolation layer 312 and the second isolation layer 314. In this embodiment, there are two rapid liquid guide layers 313 and the rapid liquid guide layer may be made of wood pulp cotton. The wood pulp cotton has a weight of 50 g±10% per square meter before soaking. By stacking two layers of wood pulp cotton, the liquid can be guided faster. In other embodiments, there may be one or more rapid liquid guide layers 313.

The first isolation layer 312 and the second isolation layer 314 may be made of materials capable of isolating odors and guiding liquid quickly and having high liquid storage capacity. The materials of the first isolation layer 312 and the second isolation layer 314 may be the same or different. The first isolation layer 312 and the second isolation layer 314 are respectively disposed on two opposite sides of the rapid liquid guide layer 313, and can isolate odors that may be generated by the material of the rapid liquid guide layer 313, such that the rapid liquid guide layer 313 can have a wider selection range of materials, and thus when selecting the material of the rapid liquid guide layer 313, only the liquid guide rate thereof needs to be considered, without considering odors. In addition, the liquid storage capacity of the first isolation layer 312 and the liquid storage capacity of the second isolation layer 314 are higher than that of the rapid liquid guide layer 313. That is, the saturated liquid absorption per unit volume of the first isolation layer 312 and the saturated liquid absorption per unit volume of the second isolation layer 314 are greater than that of the rapid liquid guide layer 313. In some embodiments, the liquid storage capacity of the first isolation layer 312 and the liquid storage capacity of the second isolation layer 314 are higher than that of the heat resistant layer 311. The liquid storage capacity of the heat resistant layer 311 is higher than that of the rapid liquid guide layer 313. The first isolation layer 312 and the second isolation layer 314 can store a larger amount of vaporization liquid, thereby further avoiding dry burning. In this embodiment, there are one first isolation layer 312 and one second isolation layer 314 and both are made of non-woven fabrics. The non-woven fabric may have a weight of 75 g±10% per square meter before soaking, and may have a thickness of 0.3 mm-0.4 mm before soaking. With the use of 75 g of non-woven fabrics, the liquid storage capacity of the composite liquid guide cotton 31 can be increased. In other embodiments, the first isolation layer 312 and the second isolation layer 314 may also be made of other materials such as mixed cotton (a mixture of linen cotton and non-woven fabric), non-woven fabric with black spots (cotton seeds), and tea fiber.

The composite liquid guide cotton 31 may include a first liquid guide portion 315, a second liquid guide portion 316, a first extension portion 317 and a second extension portion 318.

The first liquid guide portion 315 has a cross section that is in an annular shape with an opening, and has a first end 3151 and a second end 3152 opposite to the first end 3151 in the circumferential direction. From the inner layer to the outer layer, the first liquid guide portion 315 includes the heat resistant layer 311, the first isolation layer 312, the rapid liquid guide layer 313 and the second isolation layer 314 in sequence. The inner wall surface of the first liquid guide portion 315 defines a first cavity 3150, and the first cavity 3150 forms the vaporization cavity 330. The heating body 33 may be disposed on the inner wall surface of the first liquid guide portion 315. That is, the heating body 33 is disposed on the heat resistant layer 311 of the first liquid guide portion 315. In this embodiment, the heating body 33 may be a cylindrical heating sheet, and in other embodiments, the heating body 33 may also be of other structures such as a spiral heating wire and a heating film.

The second liquid guide portion 316 is annular and disposed on the periphery of the first liquid guide portion 315, and may be disposed coaxially with the first liquid guide portion 315. From the inner layer to the outer layer, the second liquid guide portion 316 includes the heat resistant layer 311, the first isolation layer 312, the rapid liquid guide layer 313 and the second isolation layer 314 in sequence. The inner diameter of the second liquid guide portion 316 is larger than the outer diameter of the first liquid guide portion 315. An annular second cavity 3160 is formed between the inner wall surface of the second liquid guide portion 316 and the outer wall surface of the first liquid guide portion 315. The second cavity 3160 can be used for the heating base 32 to penetrate into. That is, the inner wall surface of the heating base 32 is in contact with the outermost second isolation layer 314 of the first liquid guide portion 315. The outer wall surface of the heating base 32 is in contact with the innermost second isolation layer 314 of the second liquid guide portion 316.

The heating base 32 may be in a round tube shape, and may include a base body 321 and an extension portion 322 extending upward from the upper end of the base body 321. The inner diameter of the base body 321 is equal to that of the extension portion 322, and the outer diameter of the base body 321 may be larger than that of the extension portion 322, such that a stepped surface 323 is formed at the junction of the base body 321 and the extension portion 322. The lower end of the vent tube 40 may sleeve the outside of the extension portion 322, the lower end surface of the vent tube 40 may abut against the stepped surface 323, and the outer diameter of the vent tube 40 may be equal to that of the base body 321.

The first liquid guide portion 315 may be accommodated in the base body 321. The side wall of the base body 321 is also provided with at least one liquid inlet hole 3210, such that the vaporization liquid in the liquid storage member 12 can pass through the at least one liquid inlet hole 3210, enter the base body 321 and be absorbed by the first liquid guide portion 315. In this embodiment, there are two liquid inlet holes 3210, and the two liquid inlet holes 3210 may be symmetrically arranged along the circumferential direction of the base body 321.

The side wall of the heating base 32 may also be provided with at least one slot 3211. The slot 3211 may extend downward in the axial direction from the upper end surface of the extension portion 322. The first end 3151 and the second end 3152 of the first liquid guide portion 315 can pass through the slot 3211. In addition, the slot 3211 also has the function of communicating the liquid storage member 12 with the first liquid guide portion 315. In this embodiment, there are two slots 3211, the two slots 3211 may be symmetrically arranged along the circumferential direction of the heating base 32, and the slots 3211 and the liquid inlet holes 3210 may be disposed at included angles of 90 degrees along the circumferential direction of the heating base 32.

The first end 3151 of the first liquid guide portion 315 passes through the slot 3211 and is connected to one circumferential end of the second liquid guide portion 316.

The second end 3152 of the first liquid guide portion 315 passes through the slot 3211 and then extends outward in the radial direction to form the first extension portion 317. The other circumferential end of the second liquid guide portion 316 is connected to the second extension portion 318, and the second extension portion 318 and the first extension portion 317 may be the same in the extension direction. The second extension portion 318 and the first extension portion 317 may be assembled together and then clamped into the bayonet 121 of the liquid storage member 12.

When the heating assembly 30 is assembled, a sheet-like composite liquid guide cotton material may wrap the outside of the heating body 33 first to form the first liquid guide portion 315. Then, the first liquid guide portion 315 wrapped with the heating body 33 is inserted into the heating base 32 through the upper end opening of the heating base 32. The second end 3152 of the first liquid guide portion 315 extends out of the slot 3211 in the radial direction to form the first extension portion 317. The first end 3151 of the first liquid guide portion 315 passes through the slot 3211 and is wound around the heating base 32 to form the second liquid guide portion 316. Then other end of the second liquid guide portion 316 is fit to the first extension portion 317 to form the second extension portion 318. Finally, the liquid storage member 12 wraps the outside of the heating assembly 30, and the first extension portion 317 and the second extension portion 318 that are fit to each other are clamped in the bayonet 121 of the liquid storage member 12.

In this embodiment, the second liquid guide portion 316, the first extension portion 317 and the second extension portion 318 of the composite liquid guide cotton 31 are all in contact with the liquid storage member 12, such that the contact area of the composite liquid guide cotton 31 and the liquid storage member 12 is greatly increased, thereby greatly increasing the liquid absorption speed of the composite liquid guide cotton 31.

With reference to FIGS. 3-4 again, the base 20 and the end cap 50 respectively cover two ends of the liquid storage space 110, and may be made of elastic materials such as silica gel respectively, so as to facilitate the sealing and blocking of the two ends of the liquid storage space 110 to reduce leakage. Specifically, the base 20 may be embedded in the lower end opening of the liquid storage shell 11, i.e., the opening of the end of the liquid storage shell 11 close to the battery 90. The base 20 can be used to support the liquid storage member 12 and the heating assembly 30, and an air guide hole 21 that communicates with the vaporization cavity 330 may be formed on the base 20 in the longitudinal direction. The end cap 50 may be embedded in the upper end opening of the liquid storage shell 11, i.e., the opening of the end of the liquid storage shell 11 close to the suction nozzle assembly 70. The end cap 50 may be provided with a vent hole 51 that communicates with the upper end of the airflow channel 41 in the longitudinal direction.

In some embodiments, the end cap 50 may include an end cap body 52 and a nesting portion 53 extending downward from the lower end surface of the end cap body 52. The end cap body 52 and the nesting portion 53 may be coaxially disposed. The end cap body 52 is embedded in the upper end opening of the liquid storage shell 11, and the outer wall surface of the end cap body 52 may be in sealing fit with the inner wall surface of the liquid storage shell 11 to avoid liquid leakage. The upper end surface of the end cap body 52 forms a support surface 520 for supporting the liquid absorbing member 60. An annular cavity 122 may be formed between the lower end surface of the end cap body 52 and the upper end surface of the liquid storage member 12 to avoid liquid leakage caused by the end cap body 52 being squeezed against the liquid storage member 12. In other embodiments, the lower end surface of the end cap body 52 may also be in contact with the upper end surface of the liquid storage member 12.

The nesting portion 53 is inserted downward into the airflow channel 41 for assembly. In this embodiment, the outer wall surface of the nesting portion 53 is in sealing fit with the inner wall surface of the vent tube 40, and the lower end surface of the end cap body 52 is in sealing fit with the upper end surface of the vent tube 40. The outer diameter of the lower end of the nesting portion 53 may be gradually increased from the bottom to top, so as to form a guide slope, facilitating the insertion into the airflow channel 41. By reducing the length of the nesting portion 53 extending into the airflow channel 41, the length of the hole wall of the vent hole 51 for adsorbing the vaporized gas can be reduced, the loss of the aroma and sweetness of the vaporized gas can be reduced, and the accumulation of condensates in the vent hole 51 can be reduced. In some embodiments, the length of the airflow channel 41 extending into the airflow channel 41 is less than or equal to 6.5 mm.

The liquid absorbing member 60 is supported on the support surface 520 of the end cap 50 and is in contact with the support surface 520 for absorbing the condensates accumulated in the vent hole 51, thereby preventing the condensates accumulated in the vent hole 51 from being sucked into the mouth of a user. The liquid absorbing member 60 may be provided with an air outlet hole 61 that communicates with the vent hole 51 in the longitudinal direction. The liquid absorbing member 60 is usually a liquid absorbing cotton to absorb and store more condensates.

Figure 7:
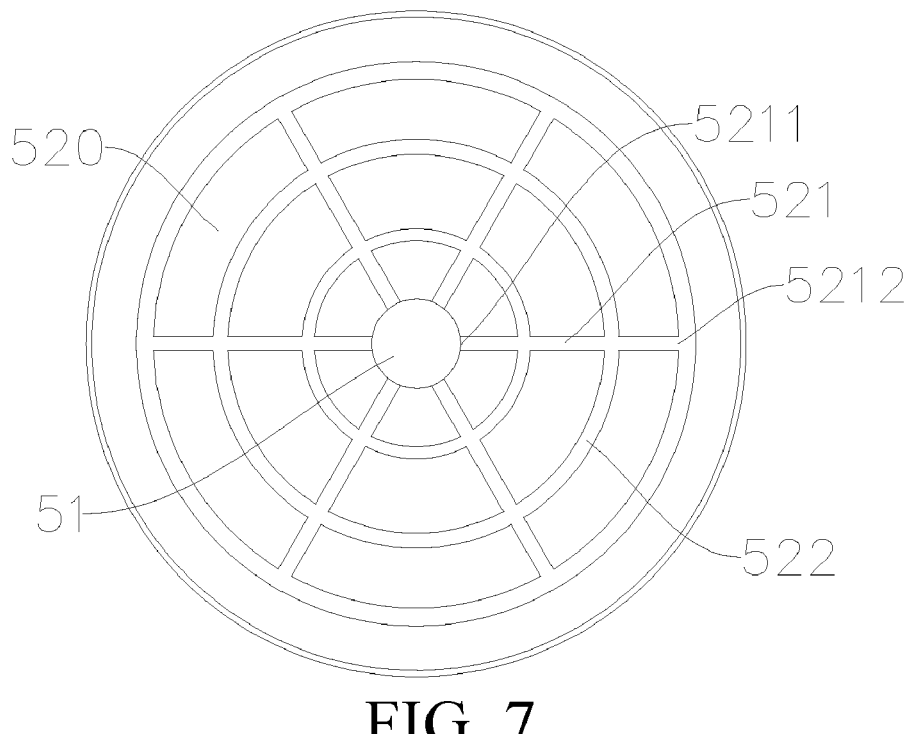
FIG. 7 is a schematic top view of an end cap in FIG. 4.

As shown in FIG. 7, at least one first guide groove 521 may be disposed on the support surface 520, and the first guide groove 521 has a first end 5211 and a second end 5212 opposite to the first end 5211. The first end 5211 of the first guide groove 521 communicates with the vent hole 51, and the second end 5212 of the first guide groove 521 extends in a direction away from the vent hole 51. The condensate at the vent hole 51 may be drained through the first guide groove 521 and then absorbed by the liquid absorbing member 60 in contact with the first guide groove 521, thereby speeding up the liquid absorbing of the liquid absorbing member 60. Preferably, the number of the first guide grooves 521 is two or more, and the second end 5212 of the first guide groove 521 extends at least to communicate with the outer edge of the bottom surface of the liquid absorbing member 60, so as to drain the condensate at the vent hole 51 to the entire bottom surface of the liquid absorbing member 60.

There is no limitation to the shape of the first guide groove 521, for example, it may be a straight groove or a curved groove. In this embodiment, the first guide groove 521 is a straight groove, and the first guide groove 521 may extend along the radial direction of the support surface 520. The maximum length of the first guide groove 521 is greater than or equal to the radius of the liquid absorbing member 60. Preferably, the number of the first guide grooves 521 is proportional to the cross-sectional area of the vent hole 51. That is, the larger the cross-sectional area of the vent hole 51 is, the more the first guide grooves 521 are required, and the better the drainage effect is. The two or more first guide grooves 521 may be evenly distributed along the circumferential direction of the support surface 520, so as to drain the condensate at the vent hole 51 to the entire bottom surface of the liquid absorbing member 60 uniformly and quickly.

Further, the support surface 520 may also be provided with at least one second guide groove 522 that communicates with the at least one first guide groove 521. The condensate at the vent hole 51 is drained to the first guide groove 521 and the second guide groove 522 that communicates with the first guide groove 521, and is then absorbed by the liquid absorbing member 60 in contact with the first guide groove 521 and the second guide groove 522. In this embodiment, the second guide grooves 522 are annular, and each annular second guide groove 522 communicates with the two or more first guide grooves 521. Preferably, the number of the second guide grooves 522 may be two or more. When the number of the second guide grooves 522 is plural, the distance between every two adjacent second guide grooves 522 in the plurality of second guide grooves 522 gradually decreases in the direction away from the vent hole 51, which can facilitate the faster spreading of the condensate at the vent hole 51 out to the periphery more quickly to be absorbed by the liquid absorbing member 60. In this embodiment, the maximum radius of the at least two second guide grooves 522 is equal to the maximum length of the first guide groove 521. It can be understood that, in other embodiments, the support surface 520 may also only be provided with the first guide groove 521 without the second guide groove 522.

As shown in FIG. 3, the suction nozzle assembly 70 includes a suction nozzle 71. The suction nozzle 71 is disposed on the upper end of the liquid storage shell 11, and an inhalation channel 710 that communicates with the air outlet hole 61 is formed on the suction nozzle in the longitudinal direction. The upper part of the liquid storage shell 11, the end cap 50 and the liquid absorbing member 60 may all be accommodated in the lower part of the suction nozzle 71.

The air guide hole 21, the vaporization cavity 330, the airflow channel 41, the vent hole 51, the air outlet hole 61, and the inhalation channel 710 are connected in sequence from the bottom to top to form a vapor conveying channel 130. The air guide hole 21 forms an air inlet channel of the vapor conveying channel 130 for introducing outside air. The airflow channel 41, the vent hole 51, the air outlet hole 61 and the inhalation channel 710 form an air outlet channel of the vapor conveying channel 130 together for outputting the vaporized gas. The outside air enters from the air inlet channel and is mixed with, when flows upward to the vaporization cavity 330, aerosol that is generated by heating the vaporization liquid by the heating assembly 30. The vaporized gas generated after mixing is then output through the air outlet channel and sucked by the user.

In some embodiments, the suction nozzle assembly 70 may also include a sealing plug 72. The sealing plug 72 may be made of an elastic material such as silica gel. The sealing plug 72 is detachably plugged into the upper end of the inhalation channel 710, and can be used to seal and block the inhalation channel 710 when the vaporizer 100 is not in use, avoiding the dust and the like from entering the inhalation channel 710.

Figure 8:
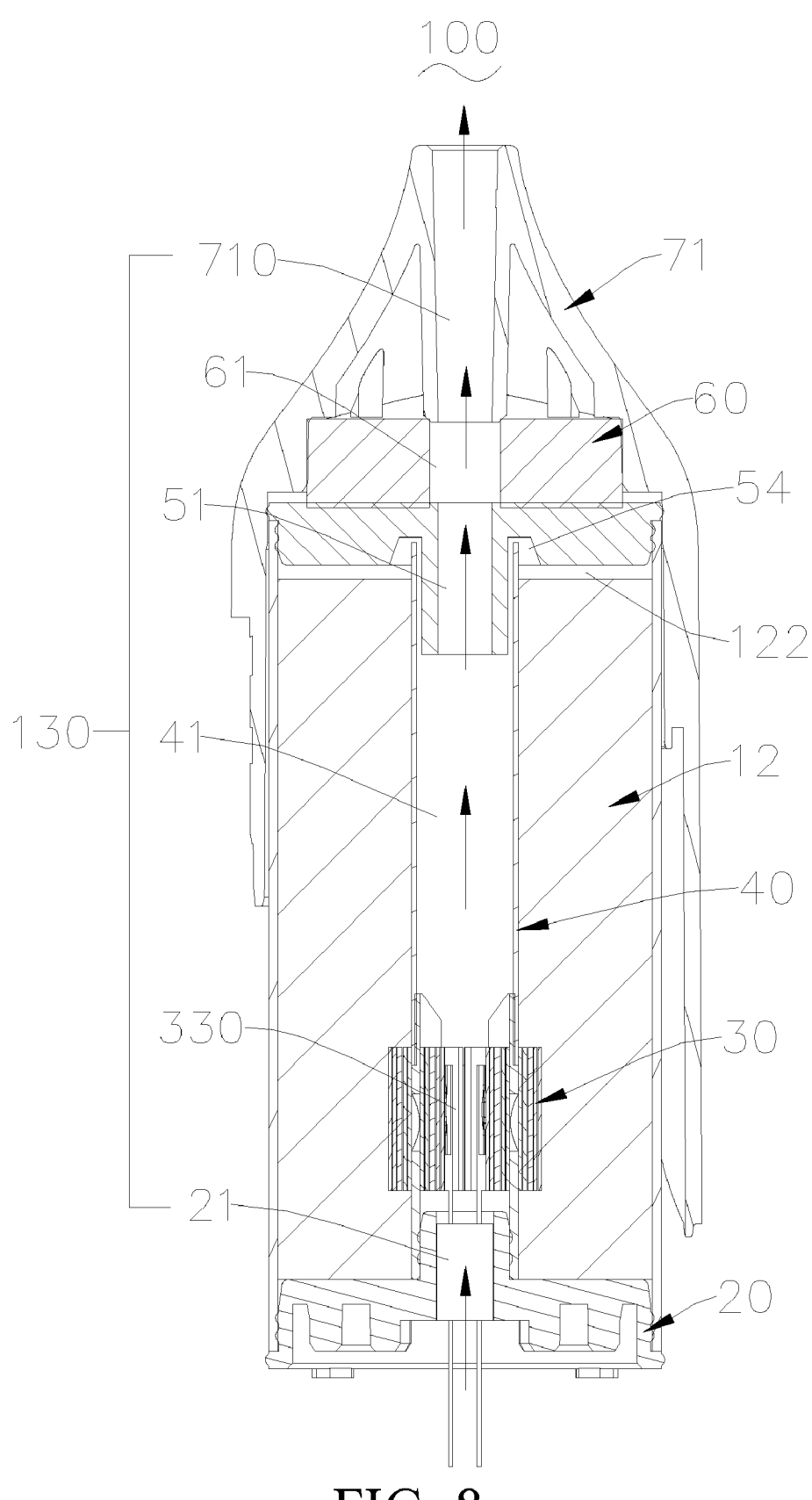
FIG. 8 is a schematic longitudinal section structural view of a vaporizer in Embodiment 2 of the invention.
Figure 9:
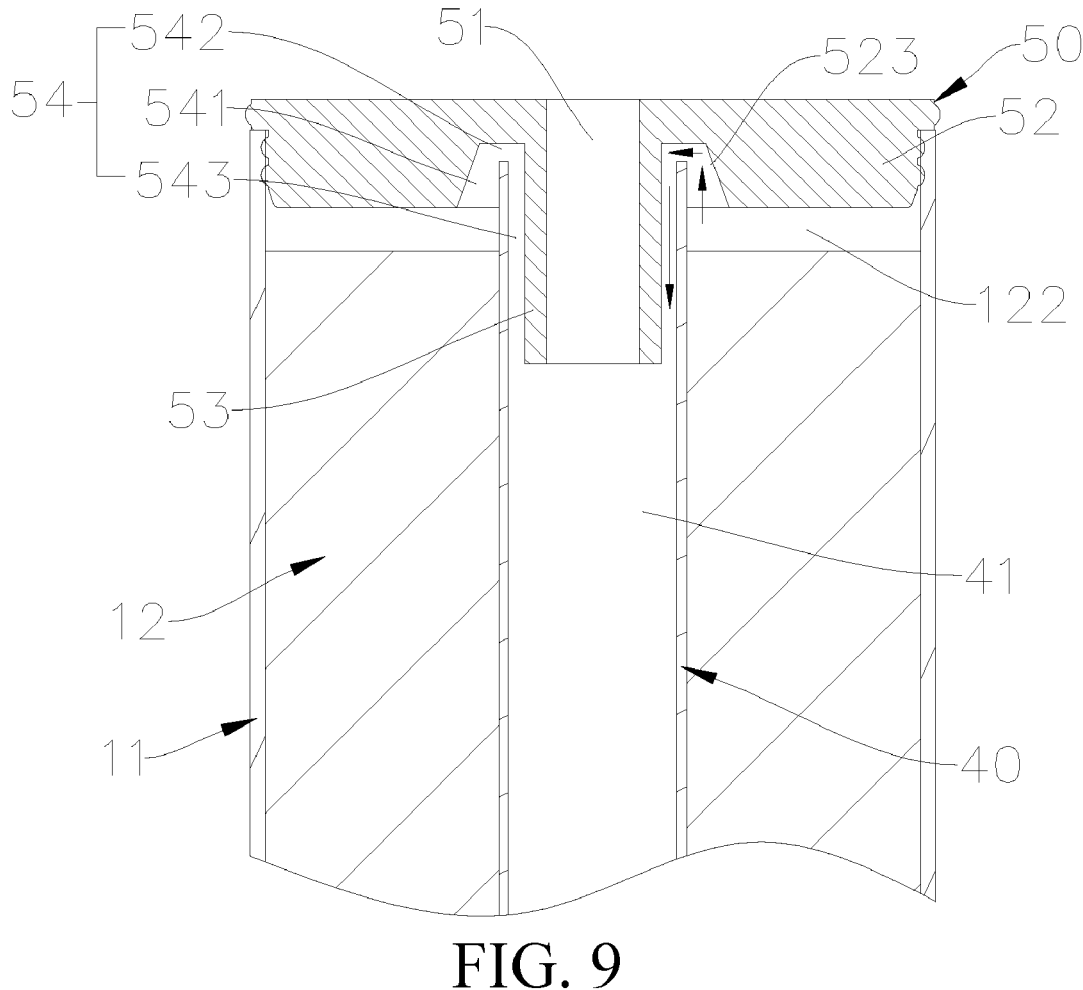
FIG. 9 is a schematic partial structural view of the vaporizer in FIG. 8.

FIGS. 8-9 show a vaporizer 100 in Embodiment 2 of the invention. The main difference from Embodiment 1 lies in that the liquid storage member 12 in this embodiment communicates with the outside through an air pressure balance channel 54. When the ambient temperature rises, the heated and expanded air inside the vaporizer 100 can be discharged to the outside of the vaporizer 100 through the air pressure balance channel 54 to avoid the excessive squeezing against the vaporization liquid, thereby solving the problem of liquid leakage at high temperature.

As mentioned above, in this embodiment, the air guide hole 21, the vaporization cavity 330, the airflow channel 41, the vent hole 51, the air outlet hole 61, and the inhalation channel 710 are connected in sequence from the bottom to top to form the vapor conveying channel 130. The air pressure balancing channel 54 may be communicated with the vapor conveying channel 130 and further communicated with the outside. Preferably, the air pressure balance channel 54 may be formed between the end cap 50 and the vent tube 40 by clearance fit, such that the liquid storage member 12 communicates with the airflow channel 41 and the vent hole 51 through the air pressure balance channel 54, and then the liquid storage member 12 communicates with the outside. The air pressure balancing channel 54 is formed between the end cap 50 and the vent tube 40 by reserving a fitting clearance therebetween. The design is simple, and operations such as forming holes and slots in parts can be avoided. In some embodiments, the fitting clearance between the end cap 50 and the vent tube 40 may be 0 mm-0.1 mm.

Specifically, in this embodiment, the end cap 50 may include an end cap body 52 and a nesting portion 53 extending downward from the end cap body 52 and extending into the airflow channel 41. The vent hole 51 runs through the end cap body 52 and the nesting portion 53 in the longitudinal direction, and may be coaxially provided with the end cap body 52 and the nesting portion 53. An annular cavity 122 may be formed between the lower end surface of the end cap body 52 and the upper end surface of the liquid storage member 12. A recess 523 is concavely formed in the bottom surface of the end cap body 52, and the recess 523 may be coaxially provided with the end cap body 52. The nesting portion 53 may be formed by extending downward from the recess bottom surface of the recess 523.

The upper end of the vent tube 40 may be accommodated in the recess 523. There is a first fitting clearance between the inner wall surface of the recess 523 and the outer wall surface of the vent tube 40. The first fitting clearance forms a first channel 541 that communicates with the cavity 122. There is a second fitting clearance between the recess bottom surface of the recess 523 and the upper end surface of the vent tube 40. The second fitting clearance forms a second channel 542 that communicates with the first channel 541. There is a third fitting clearance between the outer wall surface of the nesting portion 53 and the inner wall surface of the vent tube 40. The third fitting clearance forms a third channel 543 that communicates with the second channel 542. The first channel 541, the second channel 542, and the third channel 543 are communicated in sequence to form the air pressure balance channel 54 that communicates the cavity 122 with the airflow channel 41. When the ambient temperature rises, the heated and expanded air in the cavity 122 and the heated and expanded air in the liquid storage member 12 are discharged into the airflow channel 41 through the first channel 541, the second channel 542 and the third channel 543 sequentially, and is then discharged to the outside of the vaporizer 100 through the vapor conveying channel 130.

Figure 10:
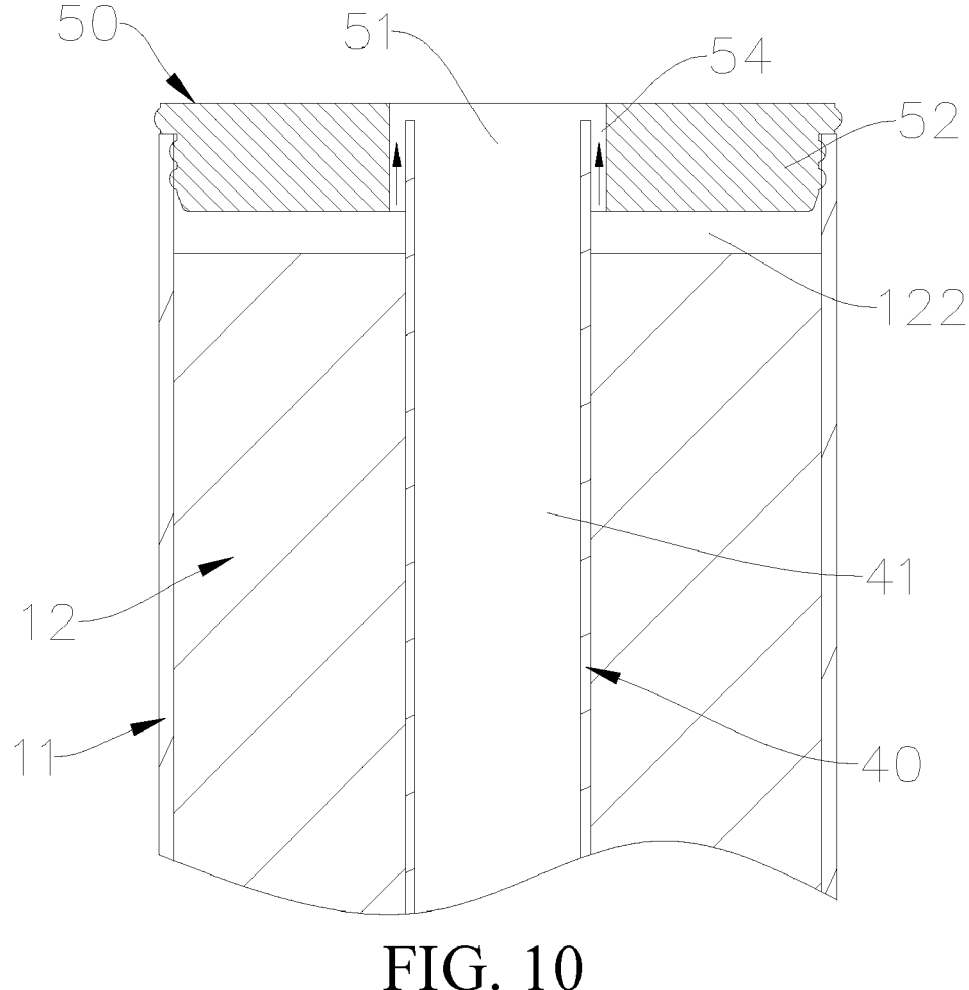
FIG. 10 is a schematic partial sectional structural view of a vaporizer in Embodiment 3 of the invention.

FIG. 10 show a vaporizer 100 in Embodiment 3 of the invention. The main difference from Embodiment 2 lies in that in this embodiment, the end cap 50 includes only the end cap body 52. Specifically, the vent hole 51 runs through the end cap body 52 in the longitudinal direction, and the upper end of the vent tube 40 extends into the vent hole 51 and communicates with the vent hole 51. There is a fitting clearance between the outer wall surface of the vent tube 40 and the hole wall of the vent hole 51. The fitting clearance forms the air pressure balance channel 54 that communicates the cavity 122 with the vent hole 51.

Figure 11:
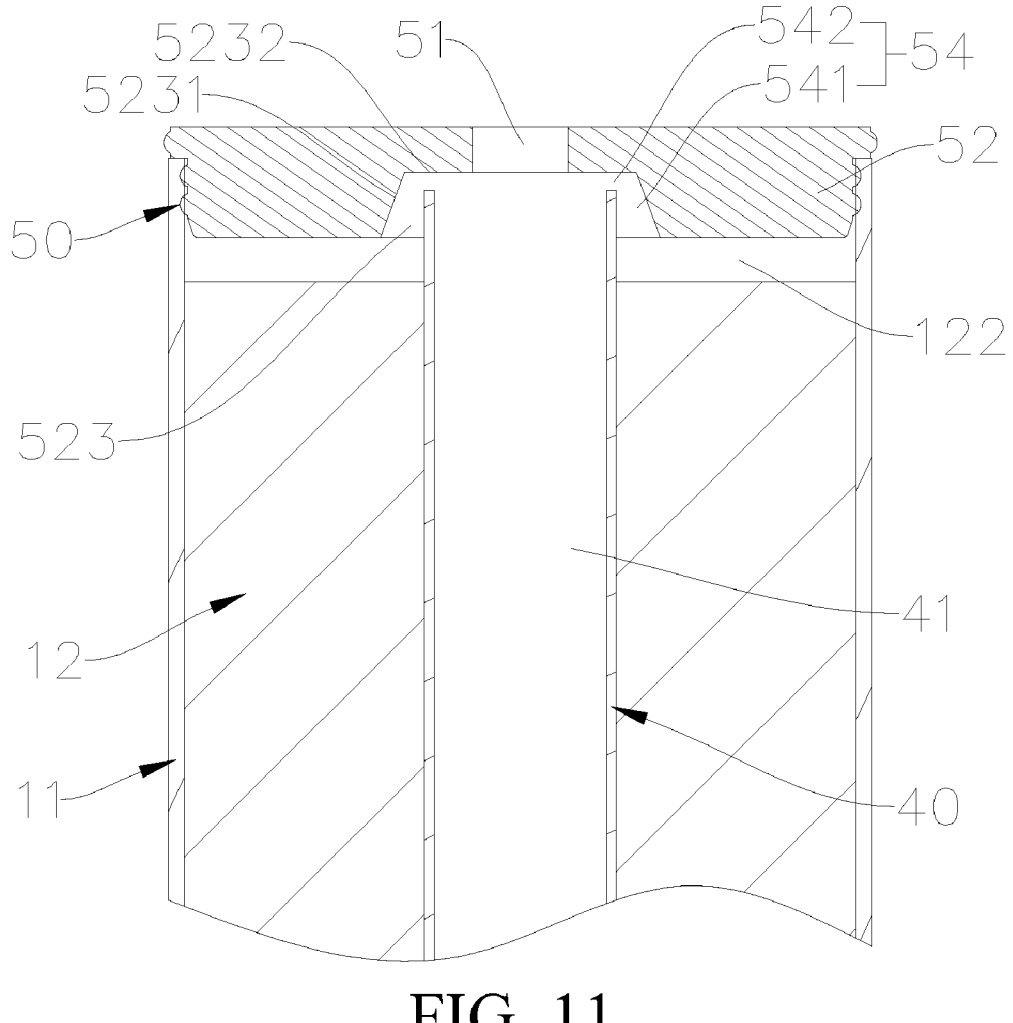
FIG. 11 is a schematic partial sectional structural view of a vaporizer in Embodiment 4 of the invention.

FIG. 11 show a vaporizer 100 in Embodiment 4 of the invention. The main difference from Embodiment 2 lies in that in this embodiment, the end cap 50 includes only the end cap body 52. Specifically, the vent hole 51 extends downward from the upper end surface of the end cap body 52, and the recess 523 that communicates with the vent hole 51 is concavely formed in the bottom surface of the end cap body 52. The outer diameter of the recess 523 is larger than that of the vent hole 51. The upper end of the vent tube 40 may be accommodated in the recess 523. There is a first fitting clearance between the inner wall surface 5231 of the recess 523 and the outer wall surface of the vent tube 40. The first fitting clearance forms a first channel 541 that communicates with the cavity 122. There is a second fitting clearance between the recess bottom surface 5232 of the recess 523 and the upper end surface of the vent tube 40. The second fitting clearance forms a second channel 542 that communicates with the first channel 541. The first channel 541 and the second and the channel 542 are communicated in sequence to form the air pressure balance channel 54 that communicates the cavity 122 with the airflow channel 41 and the vent hole 51.

Figure 12:
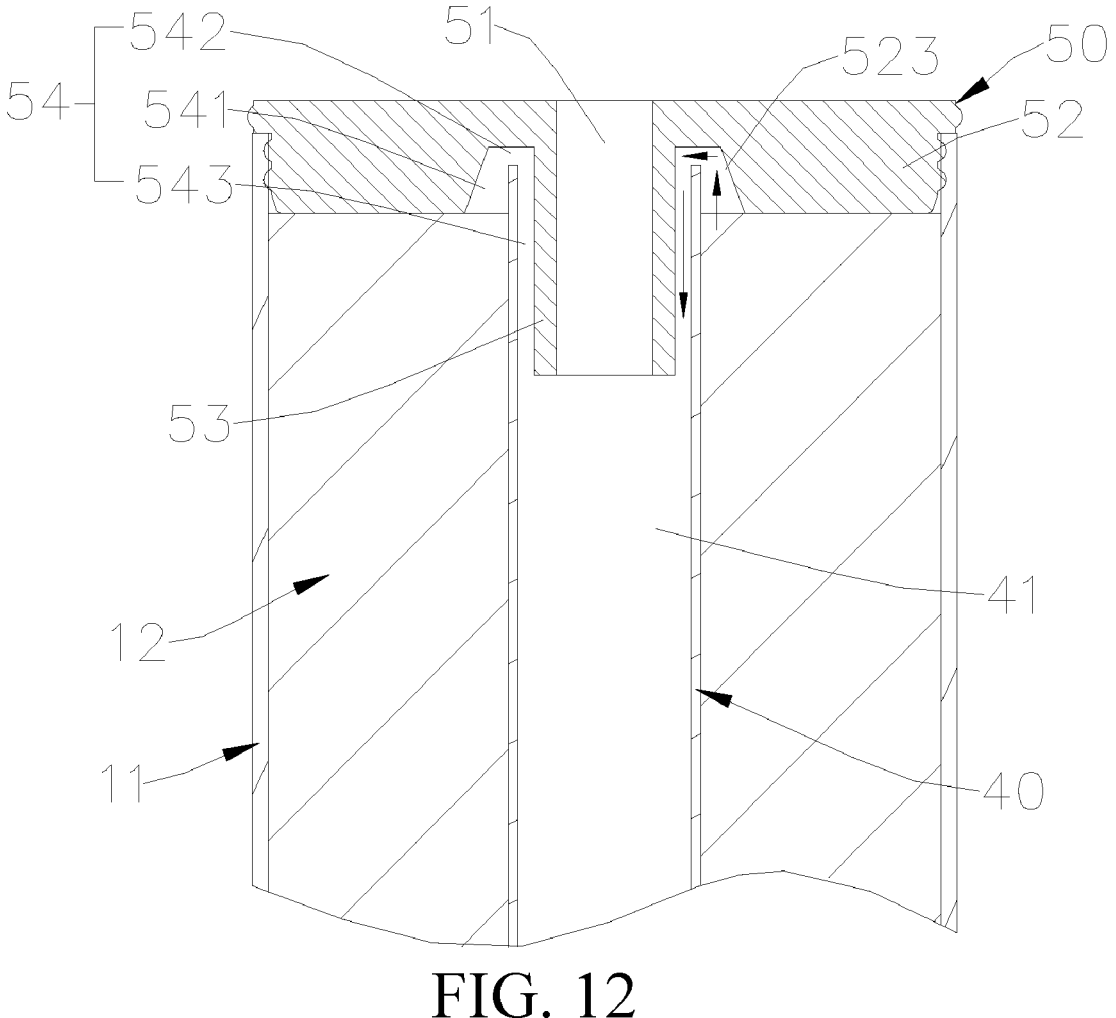
FIG. 12 is a schematic partial sectional structural view of a vaporizer in Embodiment 5 of the invention.

FIG. 12 shows a vaporizer 100 in Embodiment 5 of the invention. The main difference from Embodiment 2 lies in that in this embodiment, the lower end face of the end cap body 52 is in contact with the upper end face of the liquid storage member 12, i.e., no cavity 122 is formed between the lower end surface of the end cap body 52 and the upper end surface of the liquid storage member 12. Accordingly, in this embodiment, the first channel 541 of the air pressure balance channel 54 communicates with the liquid storage member 12. When the ambient temperature rises, the heated and expanded air in the liquid storage member 12 passes through the first channel 541, the second channel 542 and the third channel 543 in sequence, is discharged into the airflow channel 41, and is then discharged to the outside of the vaporizer 100 through the vapor conveying channel 130.

It can be understood that the technical features above can be used in any combination without limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A heating assembly, comprising:

a composite liquid guide cotton; and a heating body:

wherein the composite liquid guide cotton comprises at least one heat resistant layer, at least one first isolation layer, at least one rapid liquid guide layer, and at least one second isolation layer that are stacked in sequence to form a sequence of layers, wherein the sequence of layers forms a first liquid guide portion and a second liquid guide portion disposed coaxially with the first liquid guide portion, wherein a cross section of the first liquid guide portion comprises a first end and a second end in a circumferential direction, the first end and second end forming an opening therebetween, wherein the second liquid guide portion is connected to the first end of the first liquid guide portion, wherein the first liquid guide portion wraps an outside of the heating body, wherein the second liquid guide portion is disposed on a periphery of the first liquid guide portion, and a tubular heating base sleeving an outside of the first liquid guide portion.

2. The heating assembly of claim 1, wherein a side wall of the heating base is provided with a slot through which the first end and the second end of the first liquid guide portion are passable.

3. The heating assembly of claim 2, wherein the second liquid guide portion wraps an outside of the heating base, and wherein one circumferential end of the second liquid guide portion is connected to the first end of the first liquid guide portion.

4. The heating assembly of claim 3, wherein the composite liquid guide cotton comprises:

a first extension portion connected to the second end of the first liquid guide portion and extending out of the slot, and a second extension portion connected to an other circumferential end of the second liquid guide portion.

5. The heating assembly of claim 4, wherein the first extension portion and the second extension portion are extended in the same direction, and wherein the first extension portion and the second extension portion are assembled together.

* * * * *